(12) United States Patent
Aggarwal et al.

(10) Patent No.: US 12,211,008 B2
(45) Date of Patent: Jan. 28, 2025

(54) FAILURE MODELING BY INCORPORATION OF TERRESTRIAL CONDITIONS

(71) Applicant: Utopus Insights, Inc., Valhalla, NY (US)

(72) Inventors: Aanchal Aggarwal, White Plains, NY (US); Younghun Kim, White Plains, NY (US); Tarun Kumar, Mohegan Lake, NY (US); Abhishek Raman, Mahopac, NY (US)

(73) Assignee: Utopus Insights, Inc., Valhalla, NY (US)

( * ) Notice: Subject to any disclaimer, the term of this patent is extended or adjusted under 35 U.S.C. 154(b) by 0 days.

(21) Appl. No.: 14/745,688

(22) Filed: Jun. 22, 2015

(65) Prior Publication Data
US 2016/0283915 A1  Sep. 29, 2016

Related U.S. Application Data

(63) Continuation of application No. 14/665,247, filed on Mar. 23, 2015, now abandoned.

(51) Int. Cl.
*G06Q 10/20* (2023.01)
*G06F 16/29* (2019.01)
(Continued)

(52) U.S. Cl.
CPC ............ *G06Q 10/20* (2013.01); *G06F 16/29* (2019.01); *G06Q 10/0635* (2013.01); *G06Q 10/1093* (2013.01)

(58) Field of Classification Search
CPC .... G06Q 10/20; G06Q 10/0635; G06Q 40/06; G06Q 10/0633; G06Q 40/08;
(Continued)

(56) References Cited

U.S. PATENT DOCUMENTS 4,495,518 A * 1/1985 Sanoian ............... G01N 33/46
                                                    348/125
4,644,715 A * 2/1987 Burell ................. E04H 12/2292
                                                    175/262
(Continued)

FOREIGN PATENT DOCUMENTS

JP    2014157300    8/2014
WO    2004104891    12/2004
(Continued)

OTHER PUBLICATIONS

Boyd, S., "l1-norm Methods for Convex-Cardinality Problems," lecure notes for EE364b: Convex Optimization II, Stanford University, Mar. 6, 2015.
(Continued)

*Primary Examiner* — Jessica Lemieux
*Assistant Examiner* — Pierre L MacCagno
(74) *Attorney, Agent, or Firm* — Ahmann Kloke LLP

(57) ABSTRACT

A system and method to schedule inspections for a plurality of assets at a corresponding plurality of outdoor locations are described. The method includes retrieving location attributes of each of the plurality of assets, retrieving terrestrial geotagged images that include one or more of the plurality of assets, obtaining parameters associated with each of the plurality of assets based on information from the images, and determining risk factors associated with each of the plurality of assets based on the associated parameters and a failure mapping. The method also includes determining a risk score for each of the plurality of assets based on the corresponding risk factors, and scheduling inspections of the plurality of assets based on the risk score associated with each of the plurality of assets.

18 Claims, 5 Drawing Sheets

(51) Int. Cl.
*G06Q 10/0635* (2023.01)
*G06Q 10/1093* (2023.01)

(58) Field of Classification Search
CPC .. G06Q 10/1093; G06Q 10/06; G06Q 10/087; G06Q 40/025; G01D 3/08; G01M 99/008; G06F 17/30241; G06F 11/0709; G06F 11/0772; G06F 11/079; G06F 11/2007; G06F 11/263; G06F 2201/85; G06F 16/29; G06F 11/008; G06F 11/0751; G06F 11/0787; G06F 11/0793; G06F 11/26; G06N 5/02; G06N 7/005; H04L 45/22; H04L 63/1441; H04L 63/1416; G08B 21/18
USPC .............................................. 705/7.28, 36 R
See application file for complete search history.

(56) References Cited

U.S. PATENT DOCUMENTS

| | | | | |
|---|---|---|---|---|
| 4,921,555 A * | 5/1990 | Skiff | | B29C 73/025 156/215 |
| 5,538,752 A * | 7/1996 | Blanchette | | A01N 63/30 427/4 |
| 5,774,520 A * | 6/1998 | Bolotin | | G01B 15/025 378/50 |
| 5,985,372 A * | 11/1999 | Saka | | A01N 59/00 427/297 |
| 6,014,633 A * | 1/2000 | DeBusk | | G06Q 10/0631 705/7.12 |
| 6,609,036 B1 * | 8/2003 | Bickford | | G05B 23/024 700/30 |
| 7,035,758 B1 * | 4/2006 | Jerome | | B66C 13/04 702/150 |
| 7,523,060 B1 * | 4/2009 | Tenorio | | G06Q 30/08 705/37 |
| 7,752,125 B1 * | 7/2010 | Kothari | | G06Q 20/40 705/38 |
| 8,090,598 B2 * | 1/2012 | Bauer | | G06Q 40/02 705/4 |
| 8,131,118 B1 * | 3/2012 | Jing | | G01S 5/16 701/426 |
| 8,606,512 B1 * | 12/2013 | Bogovich | | G01C 21/3415 701/423 |
| 8,626,418 B2 * | 1/2014 | Boulet | | G08G 1/052 701/96 |
| 8,655,595 B1 * | 2/2014 | Green | | G06Q 50/16 702/5 |
| 9,183,527 B1 * | 11/2015 | Close | | G06Q 50/06 |
| 9,299,048 B2 * | 3/2016 | Fang | | G06Q 10/0635 |
| 2002/0095905 A1 * | 7/2002 | Fawley | | H01Q 1/1242 52/834 |
| 2003/0131674 A1 * | 7/2003 | Foley | | G01N 3/40 73/866 |
| 2005/0134946 A1 * | 6/2005 | Tsue | | H04N 1/0035 358/537 |
| 2005/0182650 A1 * | 8/2005 | Maddox | | G06Q 10/20 705/305 |
| 2006/0288014 A1 * | 12/2006 | Edwards | | G06Q 10/06 |
| 2007/0006315 A1 * | 1/2007 | Bushnaq | | H04L 63/1416 726/25 |
| 2007/0288295 A1 * | 12/2007 | O'Brien | | G06Q 10/06 705/7.28 |
| 2008/0263097 A1 | 10/2008 | Manson | | |
| 2009/0037485 A1 * | 2/2009 | Radel | | G06Q 30/0633 |
| 2009/0055527 A1 | 2/2009 | Akiyama | | |
| 2009/0136155 A1 * | 5/2009 | Fuhrmann | | G06Q 30/06 382/284 |
| 2009/0164385 A1 * | 6/2009 | Frain | | G06Q 40/06 705/36 R |
| 2009/0171579 A1 * | 7/2009 | Wu | | G01C 21/3623 701/431 |
| 2009/0240554 A1 | 9/2009 | Oswald | | |
| 2010/0036599 A1 * | 2/2010 | Froeberg | | G01C 21/3461 701/532 |
| 2010/0070309 A1 * | 3/2010 | Deede | | G06Q 40/08 705/4 |
| 2010/0114475 A1 * | 5/2010 | Shin | | G01C 21/30 701/533 |
| 2010/0302375 A1 * | 12/2010 | Terayoko | | G06Q 10/06 348/158 |
| 2011/0029454 A1 * | 2/2011 | Lukose | | G06Q 40/06 705/36 R |
| 2011/0307426 A1 | 12/2011 | Syed | | |
| 2012/0003956 A1 * | 1/2012 | Austin | | H04W 4/90 455/404.2 |
| 2012/0023435 A1 * | 1/2012 | Kneppers | | G06Q 90/00 715/780 |
| 2012/0059684 A1 * | 3/2012 | Hampapur | | G06Q 10/06 705/7.28 |
| 2012/0065944 A1 * | 3/2012 | Nielsen | | G06Q 10/103 703/1 |
| 2012/0105279 A1 * | 5/2012 | Brown | | G01S 19/42 342/357.24 |
| 2012/0130759 A1 * | 5/2012 | Davenport | | G06Q 10/20 707/802 |
| 2012/0173300 A1 * | 7/2012 | Davenport | | G06Q 99/00 705/500 |
| 2012/0221371 A1 * | 8/2012 | Hegazy | | G06Q 50/16 705/7.25 |
| 2012/0269456 A1 * | 10/2012 | Bekaert | | G06T 3/4038 382/284 |
| 2012/0313755 A1 | 12/2012 | Gutierrez | | |
| 2012/0317478 A1 * | 12/2012 | Hantschel | | E21B 44/00 715/255 |
| 2012/0320204 A1 * | 12/2012 | Dahlin | | G08G 1/09623 348/148 |
| 2013/0054056 A1 * | 2/2013 | King | | G06Q 10/0635 701/14 |
| 2013/0138472 A1 * | 5/2013 | Hasegawa | | G06Q 10/20 705/7.26 |
| 2013/0174259 A1 * | 7/2013 | Pearcy | | H04L 41/06 726/25 |
| 2013/0197807 A1 * | 8/2013 | Du | | G06Q 40/08 702/5 |
| 2013/0218890 A1 * | 8/2013 | Fernandes | | G06F 16/27 707/736 |
| 2013/0295857 A1 * | 11/2013 | Nuutinen | | H04B 17/0087 455/67.12 |
| 2013/0317888 A1 * | 11/2013 | Serrano | | G06Q 10/0639 705/7.36 |
| 2014/0009618 A1 * | 1/2014 | Imai | | B60Q 9/008 348/148 |
| 2014/0137257 A1 * | 5/2014 | Martinez | | H04L 63/1433 726/25 |
| 2014/0158418 A1 * | 6/2014 | Cariaga Crespo | | H02G 7/05 174/45 R |
| 2014/0236656 A1 * | 8/2014 | Nielsen | | G06Q 10/0633 705/7.17 |
| 2014/0244318 A1 * | 8/2014 | Drake | | G06Q 40/08 705/4 |
| 2014/0267734 A1 * | 9/2014 | Hart, Jr. | | G06K 9/00785 348/149 |
| 2014/0278150 A1 * | 9/2014 | Baesler | | E04H 12/00 702/34 |
| 2014/0278578 A1 * | 9/2014 | Cantwell | | G06Q 40/08 705/4 |
| 2014/0280277 A1 * | 9/2014 | Tucker | | G06F 16/9537 707/758 |
| 2014/0320650 A1 * | 10/2014 | Hong | | H04N 7/185 348/144 |
| 2014/0337086 A1 * | 11/2014 | Asenjo | | H04L 41/0896 705/7.28 |
| 2014/0358601 A1 * | 12/2014 | Smiley | | G06Q 10/0635 705/7.11 |
| 2014/0365269 A1 * | 12/2014 | Hampapur | | G06Q 10/0635 705/7.28 |

(56) References Cited

U.S. PATENT DOCUMENTS

| | | | | |
|---|---|---|---|---|
| 2015/0112731 A1* | 4/2015 | Binion | ............... | G06Q 40/08 705/4 |
| 2015/0154522 A1* | 6/2015 | Mircean | ............ | G06Q 10/0635 705/7.28 |
| 2015/0160839 A1* | 6/2015 | Krishnaswamy | ... | G06F 3/04845 715/810 |
| 2015/0199380 A1* | 7/2015 | Avramova | .......... | G06F 16/9537 707/738 |
| 2015/0242767 A1* | 8/2015 | Chatzinikos | ........... | G06Q 10/02 705/5 |
| 2015/0243171 A1* | 8/2015 | Emura | ............... | G06K 9/00805 340/435 |
| 2015/0302529 A1* | 10/2015 | Jagannathan | .......... | G06Q 40/08 705/4 |
| 2015/0309496 A1* | 10/2015 | Kah, III | ................ | A01G 22/00 700/284 |
| 2016/0004795 A1* | 1/2016 | Novak | .................... | G06F 30/20 703/1 |
| 2016/0086278 A1* | 3/2016 | Renshaw | ............... | G06Q 40/06 705/36 R |
| 2016/0103433 A1* | 4/2016 | Sahni | ....................... | G06F 16/29 700/83 |
| 2016/0189303 A1* | 6/2016 | Fuchs | ................... | G06Q 40/08 705/4 |
| 2016/0202670 A1* | 7/2016 | Ansari | ................. | G05B 13/048 700/45 |
| 2016/0233657 A1* | 8/2016 | Ceko | ....................... | E04H 12/24 |
| 2016/0306824 A1* | 10/2016 | Lopez | ................... | G06T 3/4092 |
| 2016/0343118 A1* | 11/2016 | Olsen | ....................... | G06T 5/40 |
| 2022/0058591 A1* | 2/2022 | Xiong | ................. | G06F 18/2113 |

FOREIGN PATENT DOCUMENTS

| | | |
|---|---|---|
| WO | 2008130184 | 10/2008 |
| WO | 2010068186 | 6/2010 |

OTHER PUBLICATIONS

Claussen, Martin et al., "A Global Data Set of Land-Surface Parameters," Max-Planck-Institut für Meteorologie, Report No. 135, Jun. 1994.

Daigle, Olivier, "The Effect of Woodpecker Damage on the Reliability of Wood Utility Poles," Thesis for Master of Applied Science, University of Waterloo, 2013.

Graettinger, Andrew J. et al., "GIS for the Geo-Referenced Analysis and Rapid Dissemination of Forensic Evidence Collected in the Aftermath of the Tuscaloosa Tornado," Construction Research Congress, pp. 2170-2179, May 2012.

Hitchcock, C. et al., "Surface, Sub-Surface Mapping and GeoHazard Identification and Associated Risk Mitigation for Power Transmission," IEEE PES Transmission and Distribution Conference and Exposition, Apr. 19, 2010.

Refsnaes, Steinar et al., "Timing of Wood Pole Replacement Based on Lifetime Estimation," International Conference on Probabilistic Methods Applied to Power Systems, Jun. 11, 2006.

Welte, Thomas M. et al., "Maintenance Cost Reduction by Improved Methods for Condition Assessment of Wood Poles," 21st International Conference on Electricity Distribution, Paper No. 0803, Jun. 6, 2011.

List of IBM Patents or Patent Applications Treated as Related; (Appendix P), Filed Jul. 9, 2015; 2 pages.

Aanchal Aggarwal et al., "Failure Modeling By Incorporation of Terrestrial Conditions", U.S. Appl. No. 14/665,247, filed Mar. 23, 2015.

Aanchal Aggarwal et al., "Network Management Based on Modeling of Cascading Effect of Failure", U.S. Appl. No. 14/665,316, filed Mar. 23, 2015.

Aanchal Aggarwal et al., "Network Management Based on Modeling of Cascading Effect of Failure", U.S. Appl. No. 14/745,727, filed Jun. 22, 2015.

Aanchal Aggarwal et al., "Network Management Based on Assessment of Topological Robustness and Criticality of Assets", U.S. Appl. No. 14/665,398, filed Mar. 23, 2015.

Aanchal Aggarwal et al., "Network Management Based on Assessment of Topological Robustness and Criticality of Assets", U.S. Appl. No. 14/745,775, filed Jun. 22, 2015.

* cited by examiner

FAILURE MODELING BY INCORPORATION OF TERRESTRIAL CONDITIONS

DOMESTIC BENEFIT/NATIONAL STAGE INFORMATION

This application is a continuation of U.S. application Ser. No. 14/665,247 filed Mar. 23, 2015, the disclosure of which is incorporated by reference herein in its entirety.

BACKGROUND

The present invention relates to management of assets, and more specifically, to failure modeling by incorporation of terrestrial conditions.

In many applications, physical assets are located in various outdoor environments. Utility poles, windmills, water towers, and cellular towers are such exemplary assets. The number of these assets makes regular inspection of their condition impractical. Yet, regular inspection and maintenance are important to the proper functioning of the overall system.

SUMMARY

According to one embodiment of the present invention, a method of scheduling inspections for a plurality of assets at a corresponding plurality of outdoor locations includes retrieving location attributes of each of the plurality of assets; retrieving terrestrial geotagged images that include one or more of the plurality of assets; obtaining parameters associated with each of the plurality of assets based on information from the images; determining risk factors associated with each of the plurality of assets based on the associated parameters and a failure mapping; determining a risk score for each of the plurality of assets based on the corresponding risk factors; and scheduling inspections of the plurality of assets based on the risk score associated with each of the plurality of assets.

According to another embodiment, a system to schedule inspection of a plurality of assets at a corresponding plurality of outdoor locations includes an input interface configured to obtain a selection of the plurality of assets; a processor configured to obtain terrestrial geotagged images that include one or more of the plurality of assets, obtain parameters associated with each of the plurality of assets based on information from the images, determine risk factors associated with each of the plurality of assets based on the associated parameters and a failure mapping, and determine a risk score for each of the plurality of assets based on the corresponding risk factors; and an output interface configured to output an inspection schedule for the plurality of assets based on their corresponding risk score.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, outdoor assets of a system require inspection and maintenance to ensure their proper condition and, in turn, the proper operation of the overall system. However, the number of these assets can make regular inspections challenging. Further, while some known attributes, such as installation date and material type, may suggest a given inspection schedule, environmental conditions (e.g., sunlight exposure, soil moisture level, ground relative temperature) can dramatically change the frequency with which inspection and maintenance must be performed. Embodiments of the systems and methods detailed herein relate to scheduling inspection of outdoor assets based on mapping variables, at least some of which are obtained via image processing, to failure probability.

Figure 1:
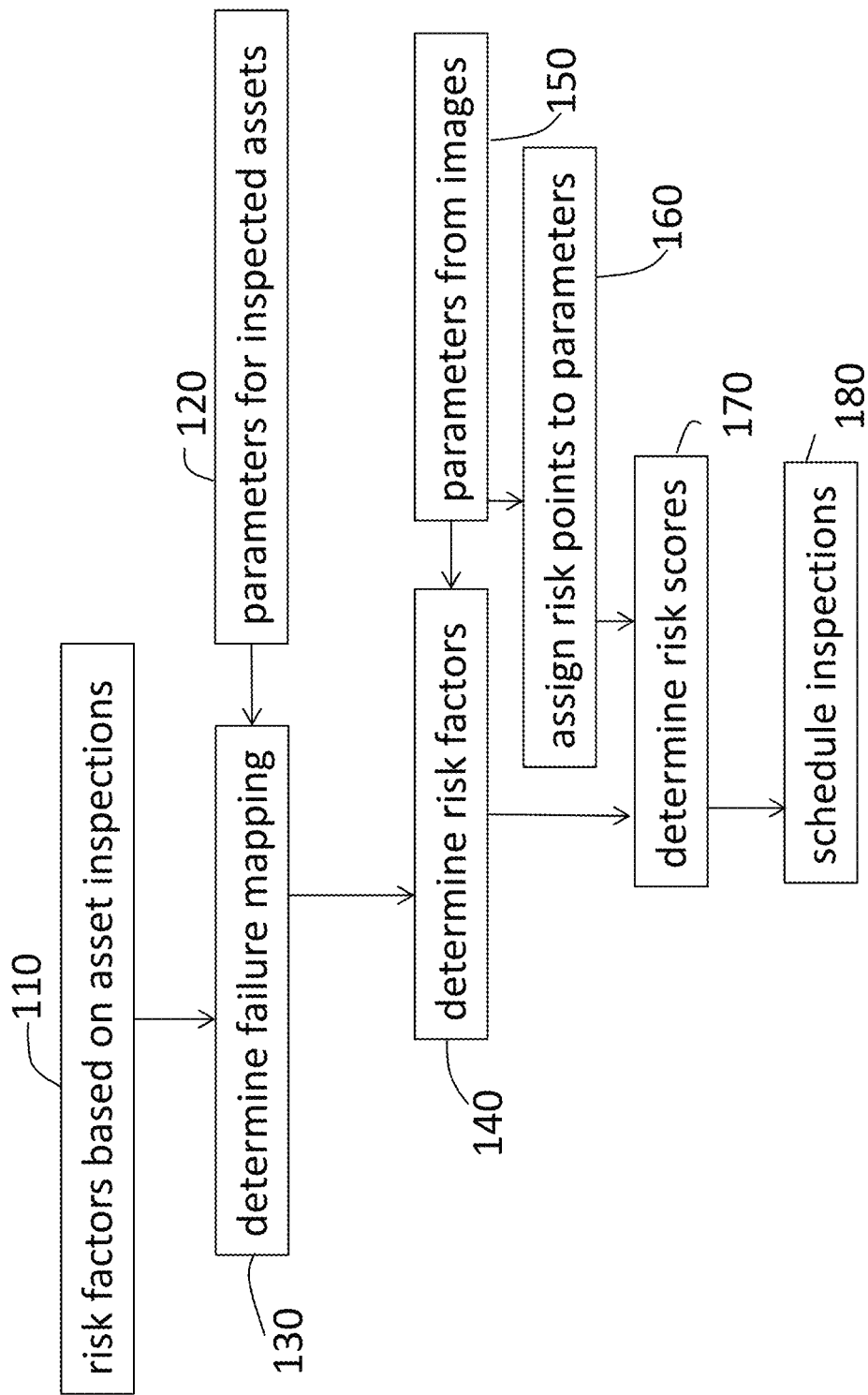
FIG. 1 is a process flow of a method of scheduling inspections of assets according to embodiments of the invention.

FIG. 1 is a process flow of a method of scheduling inspections of assets according to embodiments of the invention. At block 110, risk factors are obtained based on asset inspections and quantified to obtain a risk vector R for each asset of a set of inspected assets. Exemplary risk factors include mechanical breakdown, rotting progress (of a wooden pole, for example), animal invasion, treatment aging, vine crawling, angle (e.g., whether the asset is tilted or straight), and the risk of a tree falling. To obtain the risk vector R for each asset, a numerical score is assigned to a risk factor according to a predetermined range for each factor. Each risk factor is a continuous value contributing to a final risk score ranging 0 to 1 with 1 being the highest risk. Each risk factor may be calculated based on a risk feature in the image. For example, the total number of pixels from a forest area divided by the total number of pixels in a single image may be one risk factor, a forest risk factor. An average distance (in linear length) to the intersection areas in the map may be another risk factor. The final risk score is a weighted linear combination of all the risk factors. At block 120, parameters are obtained for the inspected assets. An exemplary parameter includes the ratio, within a specified area that includes the asset, among water, barren land, grassy area, wooded area, roads and buildings. Other exemplary parameters include the relative location of an asset to the location of trees or high-rise buildings, distance between an asset and the closest road and intersection, size and traffic conditions of the nearest road, and population of proxy for road congestion in a specified region around the asset. Each of these exemplary indications is parameterized, as further discussed below, to provide a parameter vector P associated with each asset. These parameters need not be obtained via inspection. For inspected assets and other assets (per block 150), the parameters may be obtained through geotagged image data (e.g., satellite images), for example. The process of obtaining the parameter vector P via image data is further detailed below.

At block 130, the risk factors and parameters associated with inspected assets are used to determine a failure mapping. In machine learning, the process described below of determining the failure mapping matrix F may be referred to as learning. Based on:

$$R^k = FP^k + N^k \quad [\text{EQ. 1}]$$

For each inspected asset k, the risk factors discussed above are expressed as risk vector $R^k$, the parameters discussed above are expressed as the parameter vector $P^k$, and error factors are expressed as error vector $N^k$. Exemplary error factors are associated with variability, parameterization error, and clerical error. EQ. 1 may be used to solve for the linear failure mapping matrix F by using known techniques to minimize the error vector N such that each F vector (associated with each inspected asset) is solved by minimizing:

$$|R - FP|_p \quad [\text{EQ. 2}]$$

The norm of the matrix is indicated by p. The risk vector is subject to:

$$0 \leq R \leq 1 \quad [\text{EQ. 3}]$$

$$R = [R^1, R^2, \ldots R^h]^T \quad [\text{EQ. 4}]$$

The number of observations is given by h. Also, $$P = [P^1, P^2, \ldots P^h]^T \quad [\text{EQ. 5}]$$

The result provides $$F = [F, F, \ldots F]^T \quad [\text{EQ. 6}]$$

At block 140, the failure mapping matrix (F) solved using EQ. 2 on the inspected assets is employed to determine risk factor vector R for each of the uninspected assets that are not inspected. At block 150, parameters are ascertained for uninspected assets from geotagged images (e.g., satellite images) as further described below. The parameter vectors P of each of the uninspected assets are used in EQ. 1, along with the failure mapping matrix F, which was obtained by solving EQ. 2 at block 130, to determine the risk vectors R. Parameter values (obtained from the images at block 150) are assigned risk points at block 160. The risk vector R obtained for each uninspected asset (at block 140), in addition to the risk points assigned to the parameters (at block 160) are combined to determine risk scores for each of the uninspected assets at block 170. At block 180, scheduling inspections is based on the risk scores determined at block 170. For example, a wooden electric pole may have a list of risk factors associated with the normal distance to cross-section, the electric pole being in wooded area, and near vines, which will have a risk vector of [0.1 0.8 0.9]. This indicates a low risk (0.1) due to the cross-section, because the cross-section is far, but a high risk (0.8, 0.9) associated with rot and vine invasion. Another example could be a distribution transformer in a crowded region where each distribution transformer needs to supply many more customers resulting in high risk score due to the population score.

Figure 2:
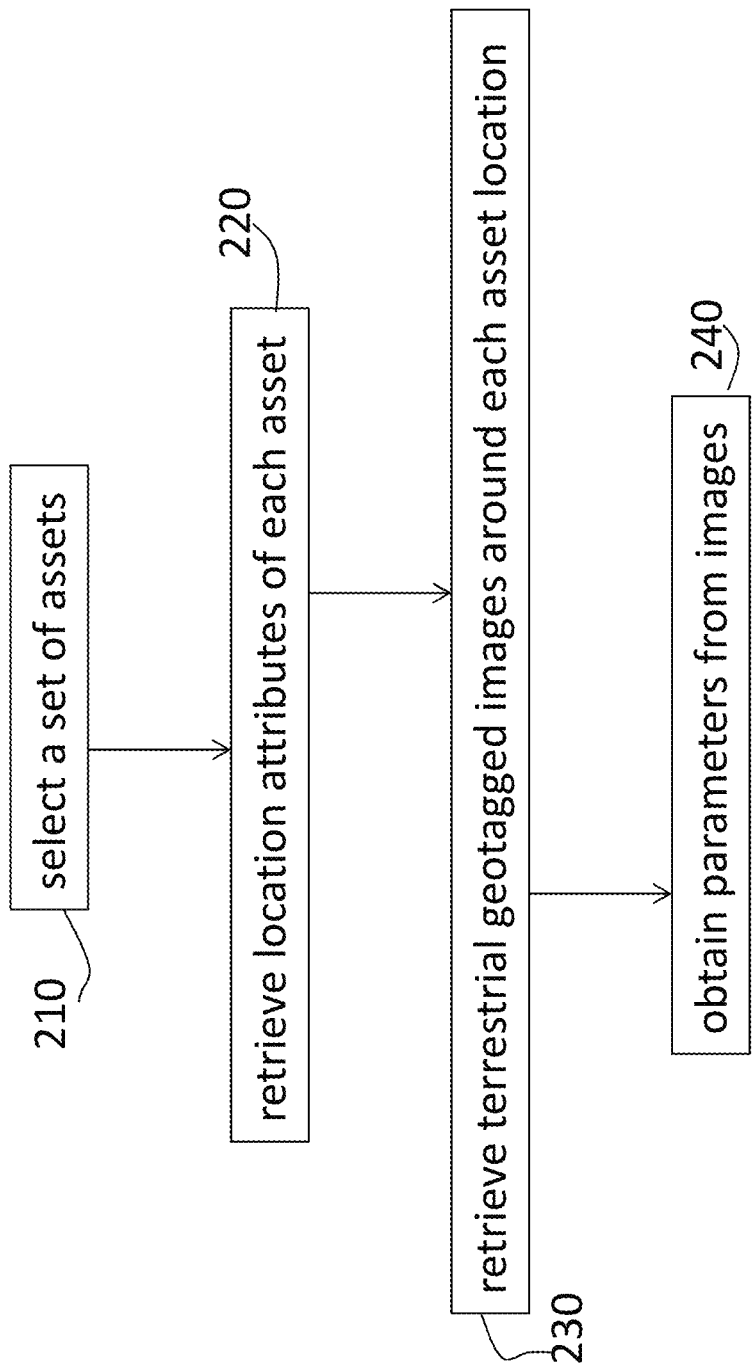
FIG. 2 is a process flow of a method of obtaining parameter values according to embodiments of the invention.

FIG. 2 is a process flow of a method obtaining and using parameter values according to embodiments of the invention. The parameter values may be obtained for blocks 120 and 150 (FIG. 1). In alternate embodiments, the parameters used at block 120 may be obtained via physical inspection of the area in which an asset is located. The description below is exemplary and does not represent an exhaustive list of parameters. Additional parameter or risk factors (discussed with reference to blocks 110 and 140 at FIG. 1) may be added based on the specific asset (e.g., windmill versus utility poll), for example. At block 210, selecting a set of assets may include selecting uninspected assets for which inspections must be scheduled (this pertains to block 150, FIG. 1). Selecting the set of asserts may instead include selecting inspected assets that will be used to determine the failure mapping matrix F (this pertains to block 120, FIG. 1). At block 220, retrieving location attributes of each asset selected at block 210 may include retrieving location information that was stored at the time of installation of the asset. This information may be alternately or additionally obtained from a global positioning system (GPS) associated with each asset, for example. Traditional triangulation techniques may also be used to obtain location information periodically and separate from inspections. The location attributes of each asset are used to retrieve terrestrial geotagged images around each asset location at block 230. The images may be obtained from a geographic information system (GIS) application, for example. The images may be satellite images or other images (e.g., obtained with a drone) that illustrate the landscape around one or more assets. Exemplary images are discussed below and show that parameters for more than one asset may be determined based on the same image. Information obtained from the images for each of the assets is parameterized as also discussed below.

Figure 3:
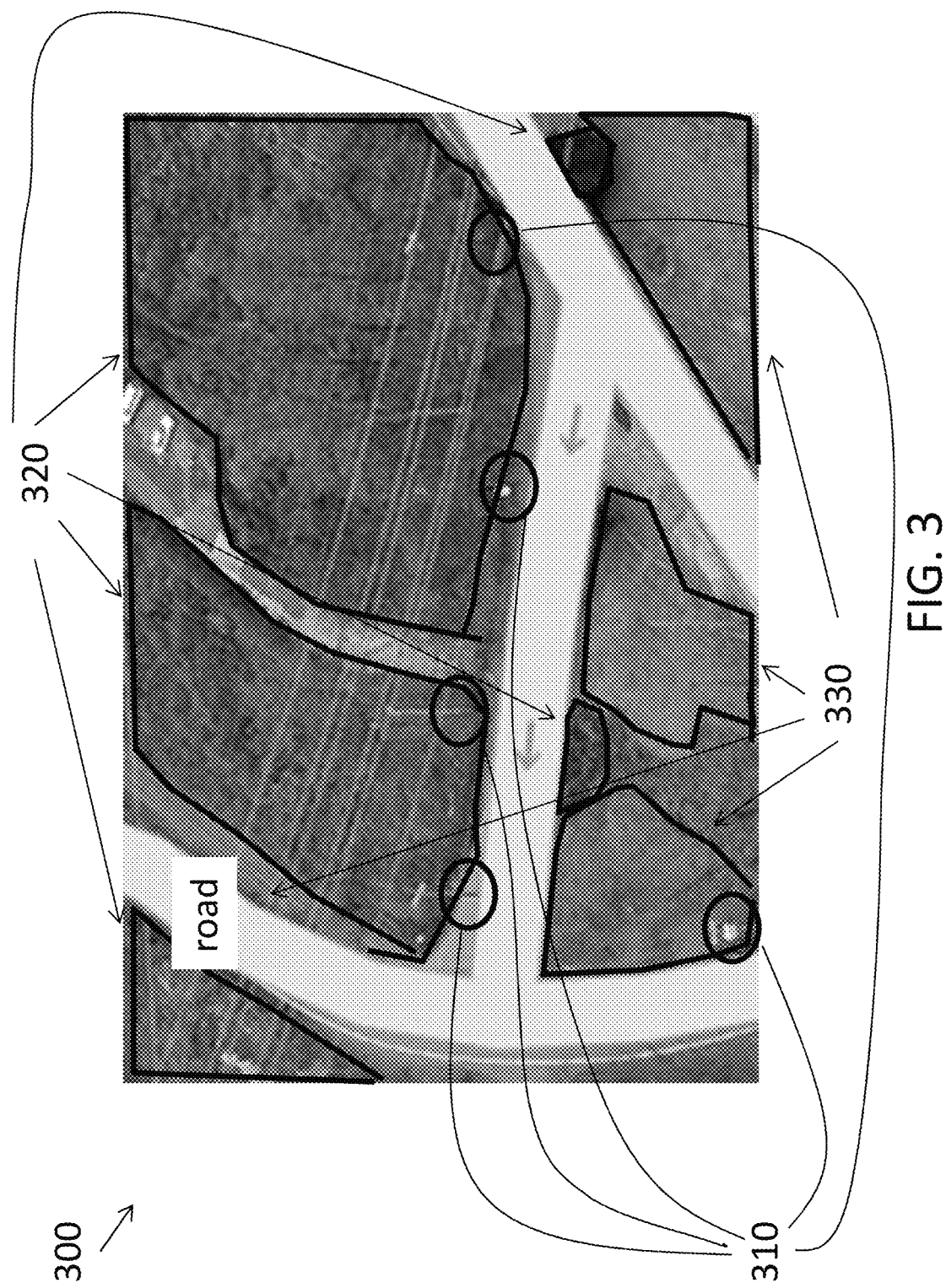
FIG. 3 illustrates an image from which a set of parameter values are obtained according to embodiments of the invention.

FIG. 3 illustrates an image 300 from which a set of parameter values are obtained according to embodiments of the invention. In the image shown in FIG. 3, the assets are utility poles 310. Areas with trees are indicated as 310, and grassy areas are indicated as 320. Other types of exemplary areas that may be identified based on the contents of an image are areas with water and areas with buildings or residences. The areas may be discerned from the images in any known way. For example, each pixel of the image may be assigned a grayscale value, and each of the types of areas (e.g., trees, barren, grass) may be identified based on a grayscale range. Once the different areas within the image 300 are identified, the information may be parameterized as a ratio of the number of pixels associated with each type of area to the total number of pixels. For example:

$$P_{barren} = \frac{\text{number\_of\_pixels\_identified\_as\_barren\_land}}{\text{total\_number\_of\_pixels}} \quad [\text{EQ. 7}]$$

$$P_{wooded} = \frac{\text{number\_of\_pixels\_identified\_as\_wooded\_land}}{\text{total\_number\_of\_pixels}} \quad [\text{EQ. 8}]$$

The parameters (used at block 150, FIG. 1) also have risk points associated with them (block 160, FIG. 1). These assignments of risk points may be based on a lookup table, for example, or another predetermined association between some or all of the parameterized information and a set of risk points. For example, weather exposure (e.g., relative direct sun exposure) of an asset indicated by the image 300 may be associated with risk points. As discussed with reference to FIG. 4 below, risk points may also be computed.

Figure 4:
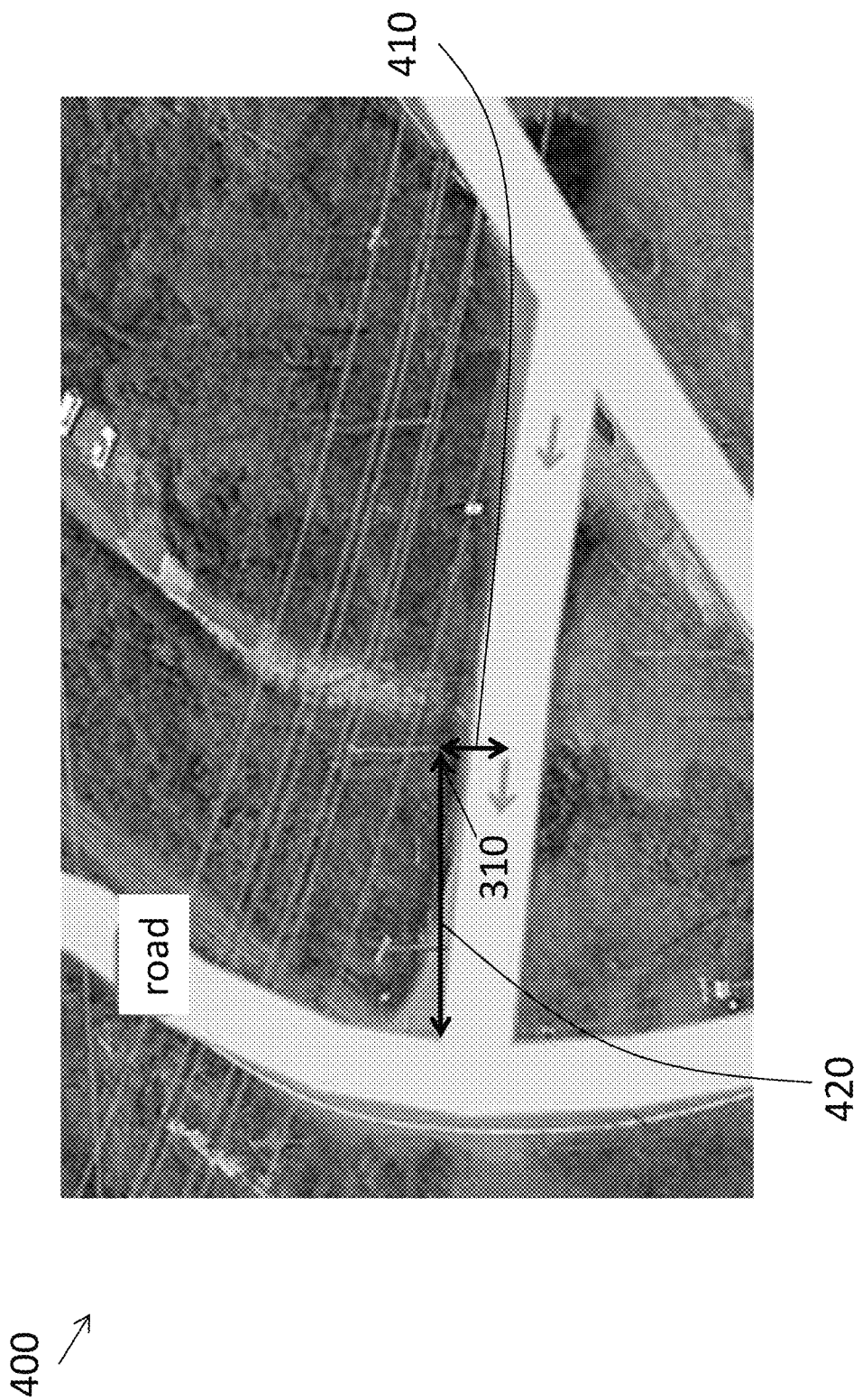
FIG. 4 illustrates an image from which another set of parameter values are obtained according to embodiments of the invention.

FIG. 4 illustrates an image 400 from which another set of parameter values are obtained according to embodiments of the invention. Again, a utility pole 310 is indicated as an exemplary asset in the image 400. The distance 410 to the closest road and the distance 420 to the closest intersection are indicated. These distances 410, 420 may be parameterized as Euclidean distances using latitude and longitude. Given a Euclidean distance $P_{distance}$, the associated risk points may be determined as follows:

$$P_{distance\_risk} = \sum_{i=1}^{k} \alpha_i \frac{1}{P_{distance}^i} \quad [EQ. 9]$$

The number of road segments is k, and the associated risk factors for each type of the road segments is $\alpha$, and $P_{distance}$ is associated with a combination of all k of the road segments.

Figure 5:
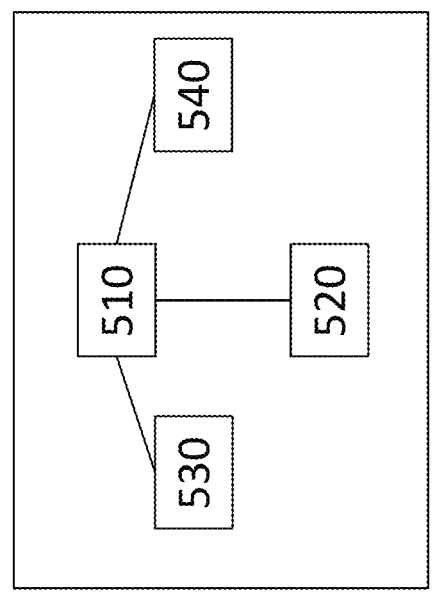
FIG. 5 is a block diagram of an exemplary system to schedule inspections of assets according to embodiments of the invention.

FIG. 5 is a block diagram of an exemplary system 500 to schedule inspections of assets according to embodiments of the invention. The system 500 includes one or more processors 510 to process the information needed to assign a risk score to each asset and thereby determine a schedule of inspections. The processor 510 executes instructions stored in one or more memory devices 520. The system 500 receives information via an input interface 530. For example, location attributes of the assets and the images needed to determine parameters for each asset may be obtained by the system 500 via the input interface 530. Location information may be stored in one or more memory devices 520 in alternate embodiments. The input interface 530 may include a keyboard or other user input device as well as an interface to other processors. The input interface 530 may facilitate selection of the set of assets whose inspection schedule is to be determined. Information produced by the system 500, such as the inspection schedule, for example, is output via an output interface 540. Communication at the input interface 530 and output interface 540 may be wireless or through other known methods.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
an input interface configured to obtain a selection of a set of utility poles; and
a processor configured to:
retrieve aerial images of a subset of the set of utility poles, the aerial images comprising terrestrial geotagged images including geotagged image data;
for each of a plurality of inspected utility poles of the set of utility poles:
determine a risk vector for a particular inspected utility pole of the plurality of inspected utility poles, the risk vector including a set of risk factors associated with the particular inspected utility pole, each of the risk factors quantifying a risk of a different type of failure, the risk factors including a probability of mechanical breakdown, a risk of wood rot and a risk of forest fire, each of the risk factors being within a same predetermined range, each of the risk factors having been determined from inspection;
determine a parameter vector for the particular inspected utility pole of the plurality of inspected utility poles, the parameter vector including a first set of parameters associated with the particular inspected utility pole, one parameter of the first set of parameters associated with the particular inspected utility pole including a value based on geographic location of the particular inspected utility pole, the first set of parameters being obtained from a physical inspection of the particular inspected utility pole, the first set of parameters also being determined based on the terrestrial geotagged images of the particular inspected utility pole, the geographic location of the particular inspected utility pole being obtained from a global positioning system associated with the particular inspected utility pole; and
determine a failure mapping array for the particular inspected utility pole of the plurality of inspected utility poles, the failure mapping array being determined based on a ratio of the risk vector for the particular inspected utility pole and the parameter vector for the particular inspected utility pole;

determine a failure mapping matrix (F) based on the plurality of failure mapping arrays associated with the plurality of inspected utility poles, the determining the failure mapping matric (F) comprising at least a portion of a machine learning process;

obtain, from the geotagged image data, a second set of parameters for each of a plurality of uninspected utility poles of the set of utility poles, wherein to obtain includes:
   assign, by the processor, grayscale values to pixels of the terrestrial geotagged images;
   identify, by the processor, types of areas in the terrestrial geotagged images by grayscale values of pixels; and
   identify, by the processor, at least one of the parameters of the second set of parameters by parameterizing a ratio of a number of pixels identified as a particular type of area to a total number of pixels in a particular terrestrial geotagged image;

determine, based on the second set of parameters and the failure mapping matrix (F), a risk vector for each of the plurality of uninspected utility poles being based on the set of risk factors associated with the plurality of uninspected utility poles;

determine a respective risk score for each of the plurality of uninspected utility poles, each of the respective risk scores determined based on the risk vector for each of the plurality of uninspected utility poles;

determine a schedule for inspection of the plurality of uninspected utility poles based on the respective risk scores of the plurality of uninspected utility poles to determine the portion of the plurality of uninspected utility poles which require inspection sooner than another portion of the plurality of uninspected utility poles, such that the plurality of uninspected utility poles may be inspected according to the schedule; and schedule a plurality of inspections of the plurality of uninspected utility poles according to the schedule.

2. The system according to claim 1, further comprising a memory device, wherein the processor obtains the terrestrial geotagged images from the memory device.

3. The system according to claim 1, wherein the processor obtains the terrestrial geotagged images from the input interface via a geographic information system (GIS) application.

4. The system according to claim 1, wherein the processor identifies at least one of the parameters of the second set of parameters based on the information from the terrestrial geotagged images by parameterizing a distance from each of the plurality of uninspected utility poles to a corresponding nearest road and a distance from each of the plurality of uninspected utility poles to a corresponding nearest intersection.

5. The system according to claim 1, wherein the processor identifies at least one of the parameters of the second set of perameters based on information from the terrestrial geotagged images by parameterizing a ratio of a size of an area comprising woods, water, or grass to a total size of an area of a corresponding image of the terrestrial geotagged images.

6. The system according to claim 1, wherein the processor is further configured to determine risk points associated with each of the plurality of uninspected utility poles based on the associated parameters.

7. The system according to claim 6, wherein the processor determines the risk score of each of the plurality of uninspected utility poles based on corresponding risk factors and corresponding risk points of each of the plurality of uninspected utility poles.

8. The system according to claim 1, wherein the processor solves the failure mapping (F) based on inspecting and analyzing the plurality of inspected utility poles.

9. An apparatus, comprising:
a processor; and
a non-transitory computer-readable storage medium storing instructions which, when executed by the processor, cause the processor to perform operations comprising:
   retrieving aerial images of a plurality of inspected utility poles and a plurality of uninspected utility poles, the aerial images comprising terrestrial geotagged images which includes geotagged image data;
   for each of the plurality of inspected utility poles:
      determining a risk vector for a particular inspected utility pole of the plurality of inspected utility poles, the risk vector including a set of risk factors associated with the particular inspected utility pole, each of the risk factors of the set of risk factors being associated with one or more inspected utility poles of the plurality of inspected utility poles, each of the risk factors quantifying a risk of a different type of failure, the risk factors including a probability of mechanical breakdown, a risk of wood rot and a risk of forest fire, each of the risk factors being within a same predetermine range, each of the risk factors having been determined from inspection;
      determining a parameter vector for the particular inspected utility pole of the plurality of inspected utility poles, the parameter vector including a first set of parameters associated with the particular inspected utility pole, one parameter of the first set of parameters associated with the particular inspected utility pole including a value based on geographic location of the particular inspected utility pole, the first set of parameters being obtained from a physical inspection of the particular inspected utility pole, the first set of parameters also being determined based on the terrestrial geotagged images of the particular inspected utility pole, the geographic location of the particular inspected utility pole being obtained from a global positioning system associated with the particular inspected utility pole; and
      determining a failure mapping array for the particular inspected utility pole of the plurality of inspected utility poles, the failure mapping array being determined based on a ratio of the risk vector for the particular inspected utility pole and the parameter vector for the particular inspected utility pole;
   determining a failure mapping matrix (F) based on the plurality of failure mapping arrays associated with the plurality of inspected utility poles, the determining the failure mapping matrix (F) comprising at least a portion of a machine learning process;

obtaining, from the geotagged image data, a second set of parameters for each of the plurality of uninspected utility poles, wherein obtaining includes:
  assigning, by the processor, grayscale values to pixels of the terrestrial geotagged images;
  identifying, by the processor, types of areas in the terrestrial geotagged images by grayscale values of pixels; and
  identifying, by the processor, at least one of the parameters of the second set of parameters by parameterizing a ratio of a number of pixels identified as a particular type of area to a total number of pixels in a particular terrestrial geotagged image;
determining, based on the second set of parameters and the failure mapping matrix (F), a risk vector for each of the plurality of uninspected utility poles, the risk vector for each of the plurality of uninspected utility poles being based on the set of risk factors associated with the plurality of uninspected utility poles;
determining a respective risk score for each of the plurality of uninspected utility poles, each of the respective risk scores determined based on the risk vector for each of the plurality of uninspected utility poles;
determining a schedule for inspection of the plurality of uninspected utility poles based on the respective risk scores of the plurality of uninspected utility poles to determine the portion of the plurality of uninspected utility poles which require inspection sooner than another portion of the plurality of uninspected utility poles, such that the plurality of uninspected utility poles may be inspected according to the schedule; and
scheduling a plurality of inspections of the plurality of uninspected utility poles according to the schedule.

10. The apparatus according to claim 9, wherein the processor obtains the terrestrial geotagged images from a memory device.

11. The apparatus according to claim 9, wherein the processor obtains the terrestrial geotagged images from a geographic information system (GIS) application.

12. The apparatus according to claim 9, wherein the processor identifies at least one of the parameters of the second set of parameters based on information from the terrestrial geotagged images by parameterizing a distance from each of the plurality of uninspected utility poles to a corresponding nearest road and a distance from each of the plurality of uninspected utility poles to a corresponding nearest intersection.

13. The apparatus according to claim 9, wherein the processor identifies at least one of the parameters of the second set of parameters based on information from the terrestrial geotagged images by parameterizing a ratio of a size of an area comprising woods, water, or grass to a total size of an area of a corresponding image of the terrestrial geotagged images.

14. The apparatus according to claim 9, wherein the operations further comprise:
  determining risk points associated with each of the plurality of uninspected utility poles based on the associated second set of parameters.

15. The apparatus according to claim 14, wherein the risk score of each of the plurality of uninspected utility poles is determined based on corresponding risk factors and corresponding risk points of each of the plurality of uninspected utility poles.

16. The apparatus according to claim 9, wherein the failure mapping matrix (F) is solved based on inspecting and analyzing the plurality of inspected utility poles.

17. The system according to claim 5 wherein the processor identifies at least one of the parameters of the second set of parameters based on a ratio of a number of pixels in the area comprising woods, water, or grass to a number of pixels in the area of the corresponding image of the terrestrial geotagged images.

18. The apparatus according to claim 13 wherein the processor identifies at least one of the parameters of the second set of parameters based on a ratio of a number of pixels in the area comprising woods, water, or grass to a number of pixels in the area of the corresponding image of the terrestrial geotagged images.

* * * * *